Nov. 10, 1925.

F. M. FURBER 1,560,795

METHOD OF MAKING MOLDED ARTICLES

Filed Sept. 27, 1919

INVENTOR
Frederich M. Furber
By his Attorney,
Nelson W. Howard

Patented Nov. 10, 1925.

1,560,795

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

METHOD OF MAKING MOLDED ARTICLES.

Application filed September 27, 1919. Serial No. 326,782.

*To all whom it may concern:*

Be it known that I, FREDERICK M. FURBER, a citizen of the United States, residing at Revere, in the county of Suffolk and State of Massachusetts, have invented certain Improvements in Methods of Making Molded Articles, of which the following description, in connection with the accompanying drawings, in a specification, like reference characters on the drawings indicating like parts in the several figures.

This invention relates to methods of making molded articles, and is illustrated with particular reference to its application in the manufacture of soles for boots and shoes.

In the manufacture of outsoles for various types of double soled shoes as well as in the manufacture of various types of soles for single soled shoes, it has been a common practice heretofore to cut the soles approximately to final size and shape, as by dieing them out or by the use of a machine of the type of the well-known planet sole rounding machine, then to mold the soles approximately to the contour of the last bottom, and thereafter, without further sole-cutting or trimming, to position the soles upon the shoes and temporarily attach them by the usual sole-laying operation. Alternatively, it has been common to cut the sole leather into sole blanks which, whether molded or not, were positioned and secured to the shoe bottoms before the ends of the blanks were given even roughly shaped sole contour. Both procedures are open to disadvantages which it is an object of this invention to obviate.

Even if the soles are cut substantially to the desired final shape and size before the molding and sole-laying operations, this shape and size are not retained since the molding operation causes the stock to flow and thereby effects a spreading of the soles, the sole stock being particularly susceptible to such spreading action if, as is common practice, it has been previously soaked in water to put it in temper. Whether or not the stock is in temper, the spreading of the sole stock caused by the molding is often irregular and cannot be calculated with accuracy. From this it results that oftentimes a molded sole is not only changed in size but is distinctly distorted from the shape originally imparted to it. This increases the difficulty of positioning the sole properly on the shoe in the sole-laying operation. Then, too, the spreading of the soles in the sole-molding operation disadvantageously affects the subsequent edge-trimming operation. If spreading due to the molding does not seriously distort the sole, whether the sole was molded in temper and thoroughly dried or was molded dry there will nevertheless be enough excess stock to be trimmed away by the edge-trimming machine to be undesirable, since for satisfactory and speedy edge-trimming there should be a minimum of waste to be trimmed. If, however, the spreading incident to the molding operation causes substantial distortion, there will be not only an excess of stock to trim away from parts of the sole edge, but in other parts the stock may be so scant as to make it difficult, if not practically impossible, to produce satisfactorily the desired sole edge contour.

A similar disadvantage of the second procedure above referred to is that when sole blanks are laid upon and attached to the shoes before any contouring of the ends of the soles, these soles, known to the trade as "blocked" soles, must be rough rounded after they are attached for the purpose of imparting to them approximately the final sole contour, and the sole edge left by the rough rounding operation cannot be as readily trimmed by the edge-trimming machine as the more clean-cut edge of a sole which is given the sole shape before it is positioned upon and attached to the shoe in accordance with the practice first above mentioned. Moreover, when blocked soles are attached to shoes, they are liable to damage the uppers of adjacent shoes while positioned in shoe racks such as are usually employed to carry the shoes from one operation to another or in placing shoes in or taking them from the racks.

For the purpose of eliminating the above-mentioned and other disadvantages of prior practices, the present invention, considering it in one aspect, is characterized by cutting shoe parts such as soles to substantially final size and peripheral contour after the soles or other parts have been molded and before they are positioned and temporarily attached to the shoes in the sole-laying operation. In the practice of the invention as herein exemplified, between the molding operation and this cutting operation, soles, whether blocked soles or, as herein illustrated, soles which were cut to sole shape before molding, after being molded in temper, are thoroughly dried to establish the molded surface contour. After molding, drying and cutting or recutting as above stated, the sole-laying operation and edge-trimming operation may be performed as heretofore.

Thus the present invention facilitates the edge-trimming operation by insuring that there will be only a minimum of waste stock to be removed by the edge-trimming machine and by providing for the edge-trimming machine a smooth, clean edge upon which to operate. In the case of soles which have been died-out or otherwise cut to sole shape before molding, the practice of this invention corrects any disadvantageous effect of the molding operation by removing excess stock occasioned by the molding and still remaining after the molded soles have been shrunk by drying. As compared with the above-mentioned practice of molding and laying sole blanks before the ends of the blanks have been given even roughly shaped sole contour, the practice of the present invention not only has the advantage of correctly contouring the soles after the molding operation, thus avoiding any spreading or distortion such as that above discussed, but it also has the further advantage previously referred to, in that the liability of damage to shoes while carrying them from one operation to another and in taking them from and replacing them in racks is lessened.

For the sake of simplicity in the apparatus utilized and to facilitate rapidity of operation, the cutting of the molded soles is herein illustrated as effected by the use of an ordinary die co-operating with a flat pressure member, the molded sole or sole blank being substantially flattened, although within the limits of its elastic recovery, and the die being forced through the stock in its flattened condition. Thereafter the sole will be allowed to resume its molded shape.

In another aspect, the invention contemplates that the molded soles or sole blanks will be cut in such manner that in the initial cutting operation in respect to any sole, the cutting means, such as a die positioned with its cutting edge extending upwardly, will be forced only part way through the first sole which then rests upon the die and serves as a support and cutting bed for the next sole, the succeeding cutting operation completing the severance of the first sole and partly cutting through the second sole. The second sole is then left upon the edge of the die, partly cut through, and in its turn supports the succeeding sole which is partly cut through while the cutting operation on its supporting sole is completed, these operations being, of course, repeated to produce the desired number of soles. Thus in each cutting operation, insurance is provided against the die striking the pressure member and either battering the die or injuring the pressure member. At the same time, each partly cut sole covers the cutting edge of the die and thereby serves as a guard to protect the operator from injury by the cutting die.

Although the invention is discussed herein with particular reference to making soles as articles of manufacture, it should be understood that in various aspects the invention is not so limited but may be utilized to advantage in the manufacture of shoe parts other than soles. Also, the term "soles" should not herein be construed as differentiating between cut soles, blocked soles or other shoe bottom parts or blanks, except as indicated by the context or required by the state of the art.

Other objects and advantages of the invention will be apparent from the following detailed description.

In the drawings:—

Figure 1:
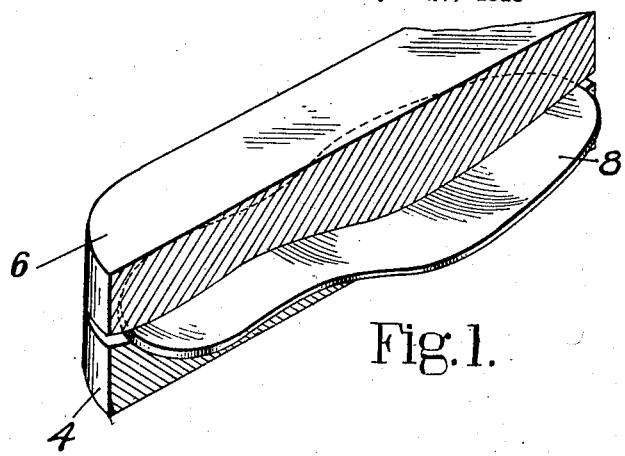
Fig. 1 is a view partly in section illustrating the operation of molding a piece of sole material.

Mechanism which may advantageously be utilized in the practice of my invention comprises molding apparatus a part of which is shown in Fig. 1 as consisting of two plates or blocks 4 and 6 which, as illustrated, are relatively shaped so as to impart to a sole 8 substantially the vertically curved surface contour of the bottom of a given shoe last and operating therefore to impart to the sole substantially the desired final surface contour. While in the illustration the piece of material 8 is disclosed as having the shape or outline of a shoe sole, it may be of a shape roughly rectangular in outline corresponding to the pieces of sole material known in the trade as "blocked" soles. Before subjecting material to the molding operation it is preferably first thoroughly soaked in water until it is soft and pliable and in temper and in condition to yield readily to the molding operation. Subsequently the molded pieces are permitted to dry thoroughly so that they will retain their molded shape.

Next, the molded soles are cut to impart to them substantially the peripheral size and contour desired in the finished shoe. If, as herein illustrated, the soles thus cut have been given approximately final peripheral shape and size before molding, there is, as above stated, a substantial spreading or distortion caused by the molding operation. The amount as well as the nature of this spreading action varies considerably according to the character and density of the sole leather. Pieces of sole leather which are relatively hard and dense spread much less under the molding pressure than pieces of leather which are relatively soft and of coarse fiber, such stock sometimes causing a given sole to have its greatest transverse dimension increased as much as 5/16 of an inch. Hence, soles which are of substantially the desired contour and size before the molding operation are advantageously recut subsequently to the molding and before they are positioned and temporarily attached to their shoes in the sole-laying operation to remove excess stock caused by the molding pressure, and to impart substantially the desired final size and edge contour.

The cutting of a molded sole to substantially its final size and shape is herein illustrated as performed by the use of an ordinary die having an upstanding cutting edge and operating to impart to the sole the desired clean cut edge, althought it is to be understood that in various aspects the invention is not limited to the peformance of the cutting step in this manner.

As disclosed, a die 10 of usual construction having an upstanding cutting edge 12 in a single plane is mounted upon a support 14 and arranged beneath a platen or pressure member 16 with which the die co-operates in cutting operations. The illustrated pressure member 16 is of metal and has a plane surface to co-operate with the cutting edge of the die 10. Preferably, in the practice of this method, the pressure member 16 will be operated by suitable means so as to cause the die to be forced only part way through the sole upon which it operates in any given cutting operation, the partly cut sole resting on the die in the next cutting operation and supporting a superposed sole. The next cutting operation will act to complete the cutting of the first sole and to cut the next sole part way through, this in its turn resting upon the upstanding edge of the die to serve as a support for the succeeding sole. It has been found that a sole which has been partly cut through as just described will not spring back so as to dislodge it from its position on the cutting die, but will remain positioned on the die. In this manner, there is in each operation provided a backing or cutting bed for the die which insures that the die will not become battered or injure the pressure member by banging against the pressure member.

In the drawings, soles 22 are shown as having been completely severed while a sole 20 is shown as having been partly severed and serving as a support for a superposed molded sole 18. It will be observed that before any sole or sole blank is cut, it will first be substantially flattened. Thus, with soles positioned as shown in the drawings and as just described, as the pressure member 16 descends, the molded sole 18 will first be substantially flattened, the partly cut sole 20 resting on the cutting edge 12 of the die 10 serving as a support for the sole 18 as the cutting of the sole 20 is completed and the sole 18 is partly cut through. Also, the sole 20 by covering the die 10 serves as a guard to protect the operator's hands. It has been found that during the flattening of the sole 18, there will be no such tendency of the sole 18 to shift laterally relatively to the cutting edge of the die 10 as to interfere with proper and accurate cutting of the sole 18.

Figure 2:
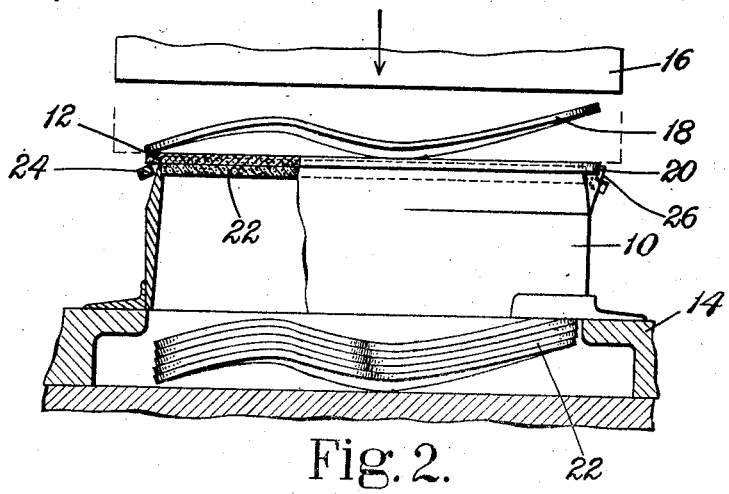
Fig. 2 is a side elevational view partly in section illustrating the operation of cutting or trimming the molded pieces.
Figure 3:
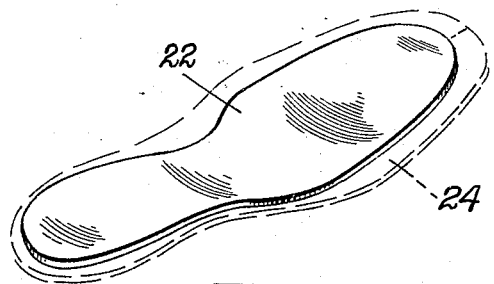
Fig. 3 is a perspective view of the completed sole, the material which has been trimmed therefrom being indicated by dotted lines.

The extent to which the piece 18 is flattened before any cutting takes place depends partly upon the density of the piece 20 on the edge of the die, since if the latter be relatively soft portions of the piece 18 will be cut into relatively early in the flattening operation, whereas if the piece 20 be relatively hard so that considerable pressure is necessary to force it further on the cutting edge of the die, cutting of the piece 18 will occur relatively late in the flattening operation, but in either case the flattening of the piece 18 does not extend beyond the elastic limits of recovery of the molded piece. As the cutting operations proceed the finished blanks 22 pass down through the die 10 and appear in stacked relation in a receptacle (not shown), while the trimmed-off or scrap portion of the material is rejected and falls away from the outside of the die as indicated at 24 in Fig. 2. Preferably short, straight edged knives located one at each end of the die, as indicated at 26, are utilized to cut the scrap.

Having described my invention, what I claim as new and desire to secure by Letters Patent of the United States is:

1. That improvement in methods of making soles which comprises positioning a molded sole in operative relation to a cutting die. flattening said sole and cutting it partly through, superposing a molded sole upon said first sole, flattening the second sole and performing a second cutting operation in such manner as to complete cutting through the first sole and to cut the second sole partly through whereby the partially cut sole serves as a support for the sole subsequently to be cut, flattening and cutting each sole in turn so that each sole is cut peripherally to a predetermined size and contour.

2. That improvement in methods of preparing parts for incorporation in boots and shoes which comprises molding shoe parts and thereby imparting to each shoe part substantially the desired final surface contour, cutting one part molded partly through, superposing another part molded upon the first part, and performing a further cutting operation in such manner as to complete the cutting through of the first part and to cut the second part partly through while utilizing the first part as a support for the second part.

3. That improvement in methods of preparing soles for incorporation in boots and shoes which comprises molding soles and thereby imparting to each sole a surface contour conforming to the bottom of a last, cutting one molded sole partly through, superposing another molded sole upon the first sole, and completing the cutting of the first sole while utilizing the second sole as a cutting bed during the completion of the cutting upon the first sole.

4. That improvement in methods of making shoe parts which comprises molding a piece of material to the desired surface contour while it is in temper, drying the piece to establish the molded shape, flattening the molded piece substantially but within the limits of its elastic recovery, and operating upon said piece while it is in the described flattened condition to produce an article having the desired characteristics including the molded surface contour.

5. That improvement in methods of preparing parts for attachment to boots and shoes which comprises molding a shoe part and thereby imparting to it substantially the desired final surface contour, flattening the periphery of the molded part substantially but within the limits of its elastic recovery, and cutting said part peripherally to a predetermined size and edge contour while it is temporarily in the described flattened condition.

6. That improvement in methods of preparing soles for attachment to boots and shoes which comprises molding a sole to impart to it a surface contour conforming to the curved surface of the bottom of a last, flattening the periphery of the molded sole substantially but within the limits of its elastic recovery, and cutting the sole while it is in the described flattened condition to substantially final size and peripheral contour.

7. That improvement in methods of preparing soles for attachment to boots and shoes which comprises tempering a sole, molding the sole thereby imparting to it a vertically curved surface contour conforming to the surface contour of the bottom of a last, flattening the periphery of the sole substantially but within the limits of its elastic recovery, and cutting the sole peripherally while it is in flattened condition to substantially final size and peripheral contour.

8. That improvement in methods of preparing soles for attachment to boots and shoes which comprises cutting a sole to substantially final size and peripheral contour, wetting the sole to temper it, molding the sole while it is in temper thereby imparting to it a surface contour conforming to the surface contour of the bottom of a last, drying the sole to establish its molded surface contour, flattening the sole peripherally substantially but within the limits of its elastic recovery, and recutting the sole peripherally while it is in flattened condition to remove waste material caused by spreading of the sole under the molding pressure.

9. That improvement in methods of preparing shoe parts for incorporation in boots and shoes which comprises cutting a shoe part to a predetermined peripheral contour, molding the part to impart to it a predetermined surface contour, and peripherally recutting said part to remove waste material caused by spreading of the part under the molding pressure.

10. That improvement in methods of preparing soles for attachment to boots and shoes which comprises wetting a sole to temper it, molding the sole thereby imparting to it while it is wet and pliable a predetermined surface contour conforming to the curved surface of the bottom of a last, drying the sole to establish the molded surface contour, and cutting the sole to substantially final size and peripheral contour.

11. That improvement in methods of preparing soles for attachment to boots and shoes which comprises molding a sole to impart to it a surface contour conforming to the curved surface of the bottom of a last, and cutting the molded sole to substantially final size and peripheral contour.

12. That improvement in methods of preparing parts for incorporation in boots and shoes which comprises wetting a part to temper it, molding the part to a predetermined surface contour, drying the molded part, and subsequently cutting the part to impart to it a predetermined size and peripheral contour.

13. That improvement in methods of preparing boot and shoe parts which comprises molding a part to substantially the surface contour which it is desired the part shall have in the finished shoe, and thereafter but before the part is incorporated in a shoe cutting it to impart to it a predetermined size and peripheral contour.

14. That improvement in methods of preparing soles for attachment to boots and shoes which comprises cutting a sole to substantially the desired final peripheral contour, wetting the sole to temper it, molding the sole while it is in temper thereby imparting to it a surface contour conforming to the curved surface of the bottom of a last, drying the sole to establish the molded surface contour, and then peripherally recutting the sole to remove excess material caused by the molding pressure and remaining after the molded sole has been shrunk by drying.

15. That improvement in methods of preparing soles for attachment to boots and shoes which comprises cutting a sole to a predetermined peripheral contour, molding the sole to impart to it a vertically curved surface conforming to the vertical curvature of the bottom of a last, and then recutting the sole to substantially the desired final size and peripheral contour.

In testimony whereof I have signed my name to this specification.

FREDERICK M. FURBER.

Certificate of Correction.

It is hereby certified that in Letters Patent No. 1,560,795, granted November 10, 1925, upon the application of Frederick M. Furber, of Revere, Massachusetts, for an improvement in "Methods of Making Molded Articles," errors appear in the printed specification requiring correction as follows: Page 4, lines 4 and 5, claim 2, strike out the word "molded" and insert same before the word "part" in same lines and claim; and that the said Letters Patent should be read with these corrections therein that the same may conform to the record of the case in the Patent Office.

Signed and sealed this 26th day of January, A. D. 1926.

[SEAL.]
WM. A. KINNAN,
*Acting Commissioner of Patents.*